United States Patent [19]

Popper

[11] 4,140,024
[45] Feb. 20, 1979

[54] CAM SYSTEM

[75] Inventor: Peter Popper, Wilmington, Del.

[73] Assignee: E. I. Du Pont de Nemours and Company, Wilmington, Del.

[21] Appl. No.: 826,062

[22] Filed: Aug. 19, 1977

Related U.S. Application Data

[63] Continuation-in-part of Ser. No. 707,633, Jul. 22, 1976, abandoned.

[51] Int. Cl.² .............................................. F16H 27/04
[52] U.S. Cl. ...................................... 74/86; 308/4 R
[58] Field of Search ................. 308/4, 72; 74/501, 86; 64/2 P, 2 R

[56] References Cited

U.S. PATENT DOCUMENTS

| | | | |
|---|---|---|---|
| 2,711,653 | 6/1955 | Zero | 64/2 R |
| 2,732,861 | 1/1956 | Gilmore | 74/501 R |
| 2,813,408 | 11/1957 | Christodolu | 64/2 R |
| 2,957,353 | 10/1960 | Babacz | 64/2 R |
| 3,043,120 | 1/1962 | Waldron | 74/501 |
| 3,196,706 | 1/1965 | Sevrence | 74/501 |
| 3,376,082 | 4/1968 | Soder | 308/237 |
| 3,439,555 | 4/1969 | Rech | 74/501 R |
| 3,552,808 | 1/1971 | Mathers et al. | 308/72 |

Primary Examiner—Benjamin W. Wyche
Assistant Examiner—Wesley S. Ratliff, Jr.

[57] ABSTRACT

A cam system capable of converting a simple motion into a more complex motion contains, in combination, an elastomeric guide bearing and a shaped rod lodged therein, the bearing being held by a member allowing it to assume a proper orientation, either the bearing-holding member or the shaped rod being subjected to the input motion, so that the shaped rod and the guide bearing move relative to each other. Either the moving member or the stationary member is constrained in that it has only two degrees of freedom to rotate. Any moving point on the moving member can be made to perform useful work while it moves in a more complex pattern. A representative embodiment will convert a one-dimensional, sliding motion or a circular motion into a three-dimensional motion, the moving end of the moving member having attached thereto a spray-paint nozzle, which sprays paint in a three-dimensional pattern.

23 Claims, 25 Drawing Figures

4,140,024

CAM SYSTEM

CROSS-REFERENCE TO RELATED APPLICATION

This is a continuation-in-part of my copending application Ser. No. 707,633, filed July 22, 1976, now abandoned.

BACKGROUND OF THE INVENTION

This invention relates to a novel cam system employing an elastomeric guide bearing and a shaped rod.

It is often important to be able to transmit motion in a three-dimensional pattern. When such motion is to be transmitted repetitively, for example in an automated process, it is often necessary to devise a cam or a cam system capable of converting a simple motion of, say, a sliding or rotating element into the desired more complex pattern. There may be several cooperating cams required to perform this task, and they may have to be formed into complicated shapes. Conversion of a simple motion into a complex motion sometimes presents, therefore, a difficult problem.

Use of a springy or resilient bearing or guide for a moving member is known to the art. See, for example, U.S. Pat. Nos. 2,347,885 (to Crickmer); 3,046,062 (to Wettstein); and 3,185,531 (to Modrey). Yet, there is no suggestion in the art that a combination of an elastomeric guide bearing and a shaped rod would be useful in a cam system capable of converting a simple motion into a complex, three-dimensional motion. There is a host of potential applications for simple devices able to perform this task.

DEFINITIONS

For the purpose of the present invention, a cam system is a combination of at least one member which programs the desired motion and at least one other member which cooperates with the programming member in transmitting the desired motion. In a conventional cam system, such a combination would include a cam and a cam follower.

A three-dimensional motion is any motion other than planar or linear.

A two-dimensional motion is a motion in a single plane.

A one-dimensional motion is a motion in a straight line.

A more complex motion is a motion in more dimensions than a simple motion.

A simple motion, depending on the context in which the term is used, is a one-dimensional or a two-dimensional motion.

SUMMARY OF THE INVENTION

According to the present invention, there is now provided a cam system capable of converting a simple motion into a more complex motion, said system comprising, in combination (a) a guide bearing capable of elastic deformation, (b) a bearing-holding member adapted to receive said bearing and capable of changing the orientation of said bearing, (c) a shaped, substantially rigid rod supportively held by said bearing, said rod and said bearing being capable of a relative motion with respect to each other, and at least one of said rod and said bearing-holding member (b) being linked with a source of the simple motion to be converted;

one of said rod and said bearing-holding member being constrained so that it has only two degrees of freedom of rotational motion;

the area of contact of said rod with said bearing either being lubricated or having a low relative friction coefficient.

THE DRAWINGS

FIGS. 3a through 3d will show schematically the movement sequence of shaped rod to which is imparted a linear motion X.

FIGS. 4a through 4d schematically illustrate the movement sequence of shaped rod 1 to which is imparted at one end a circular motion.

Figure 5A:
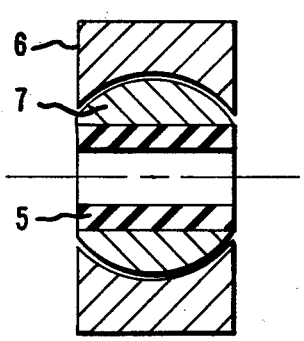
Figure 5B:
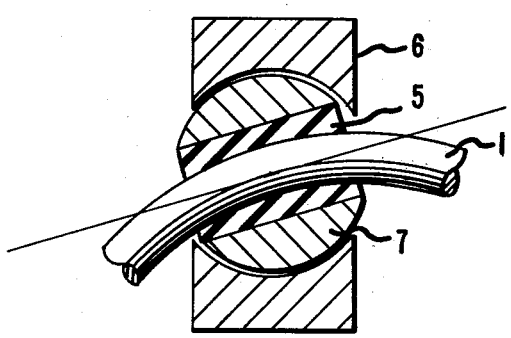

FIGS. 5a and 5b show a construction detail of an elastomeric guide bearing 5 held in a holding member 6 by means of a ball joint 7.

Figure 6:
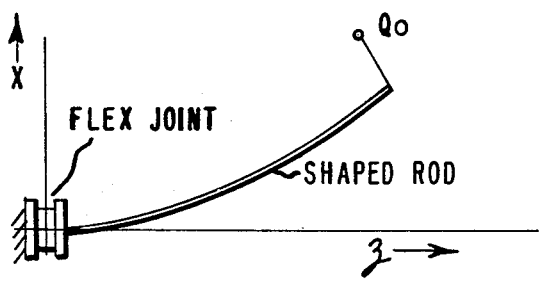

FIG. 6 represents schematically the shaped rod in a coordinate system.

Figure 7:
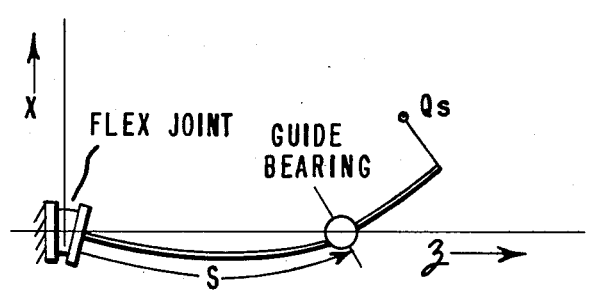
Figure 2A:
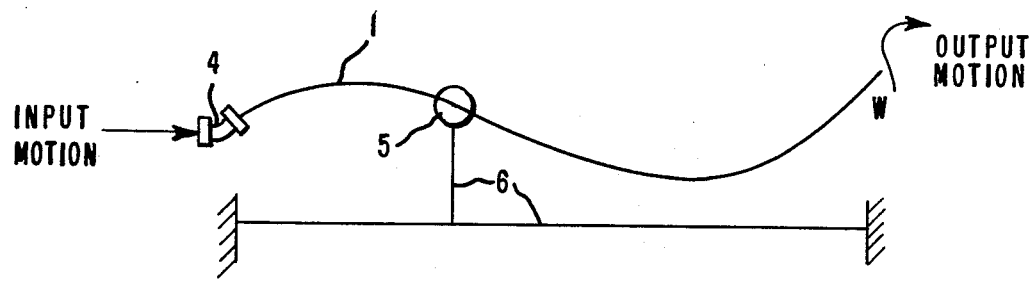
FIGS. 2a–2d illustrates four alternative arrangements of the guide and shaped rod which are either stationary or moving.
Figure 2B:
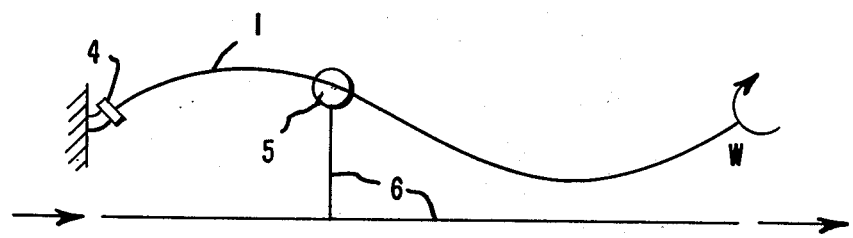
Figure 2C:
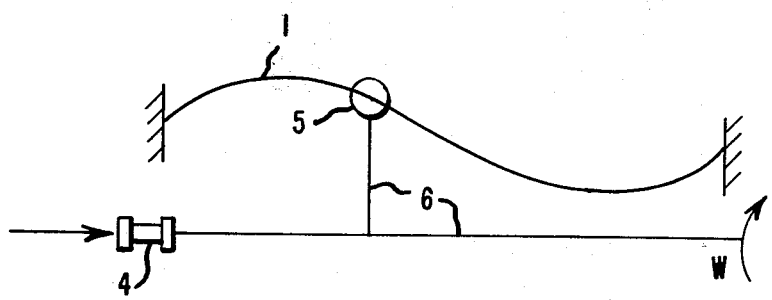
Figure 2D:
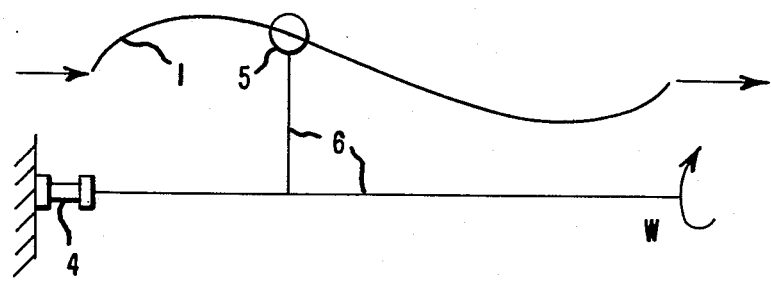
Figure 3A:
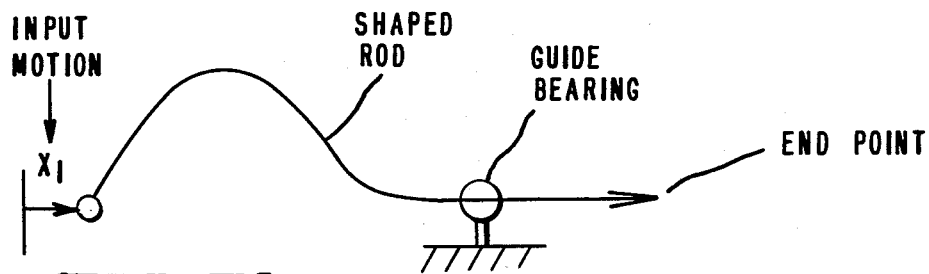
Figure 3B:
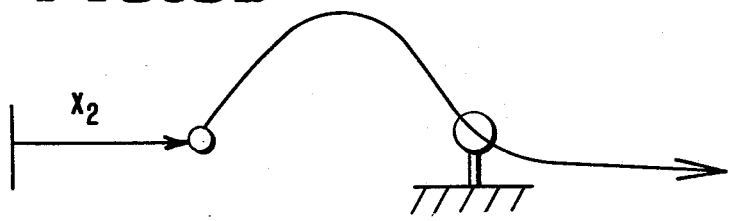
Figure 3C:
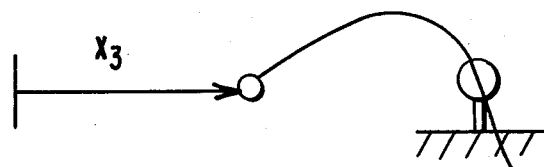
Figure 3D:
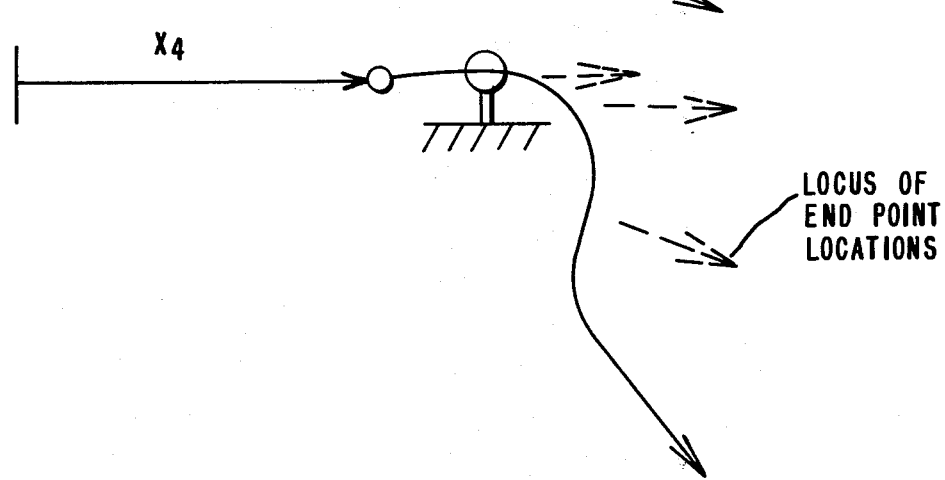
Figure 4A:
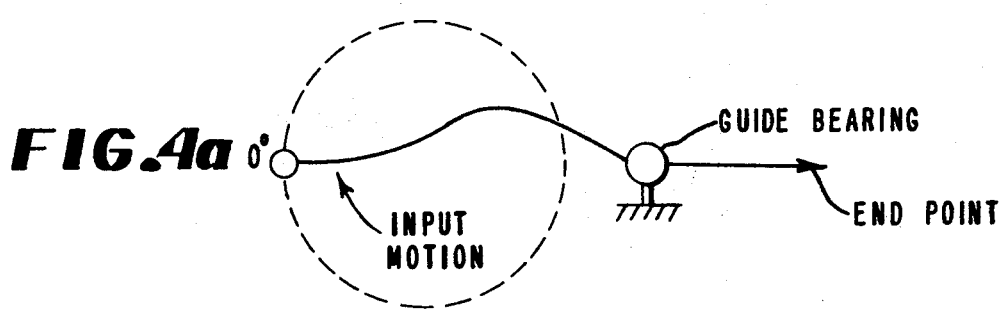
Figure 4B:
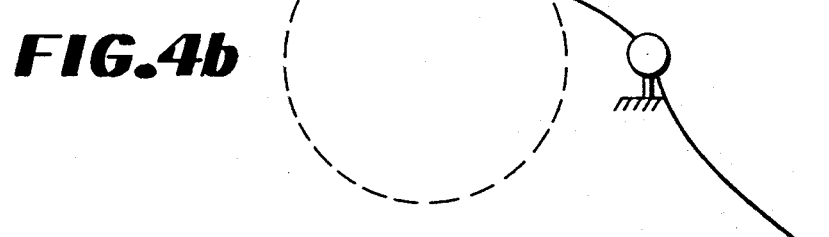
Figure 4C:
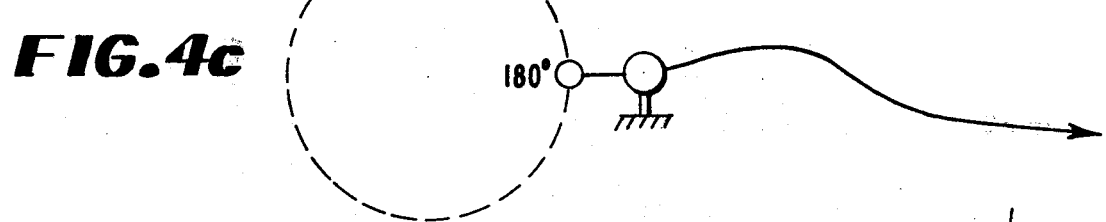
Figure 4D:
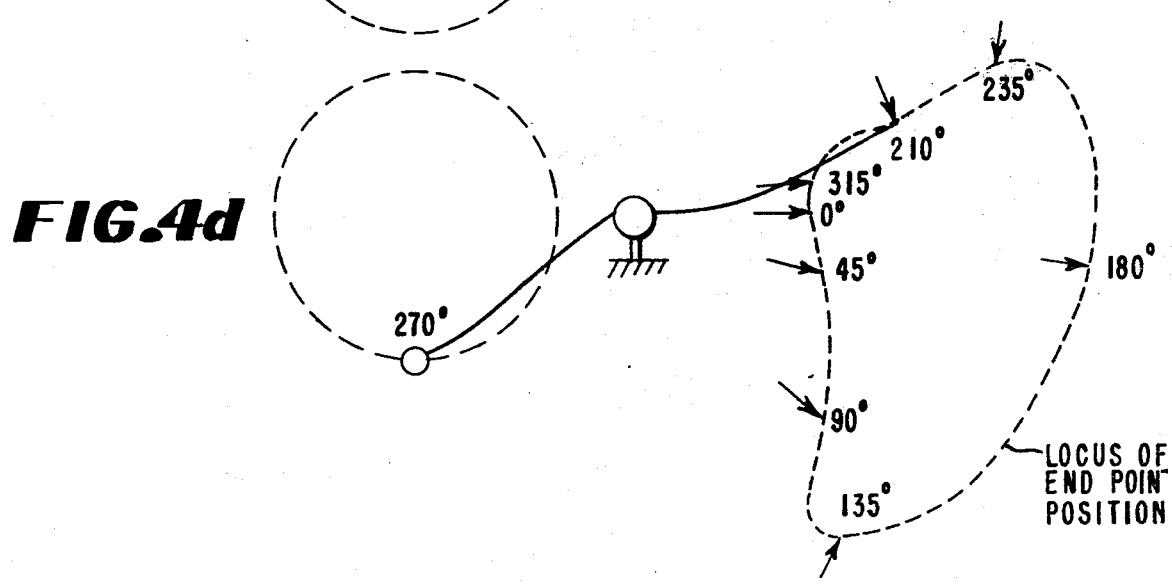

FIG. 7 represents schematically the shaped rod and elastomeric guide bearing in a coordinate system.

Figure 8A:
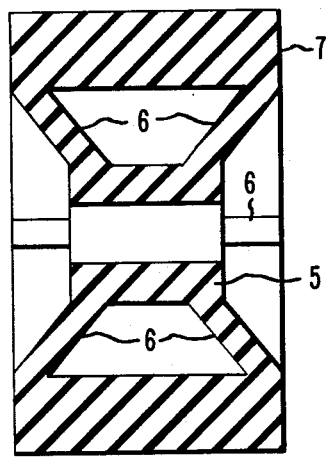
Figure 8C:
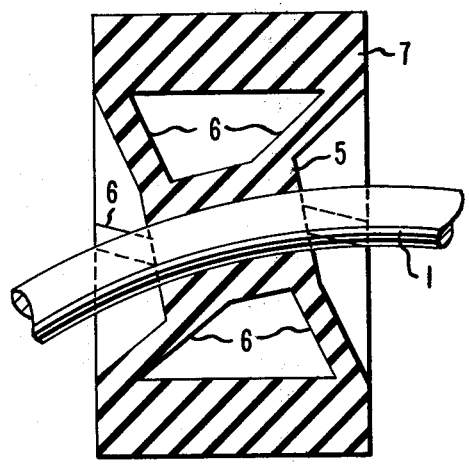
Figure 8B:
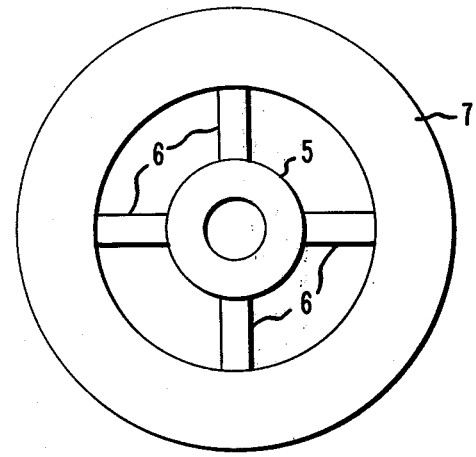

FIGS. 8a–8c shows an integrally fabricated assembly of an elastomeric guide bearing and a bearing-holding member.

Figure 9A:
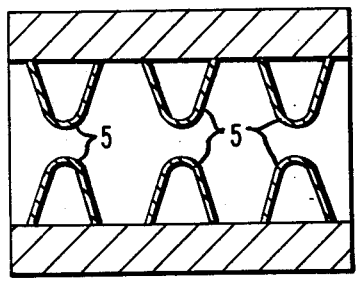
Figure 9B:
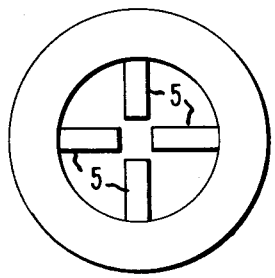
Figure 9C:
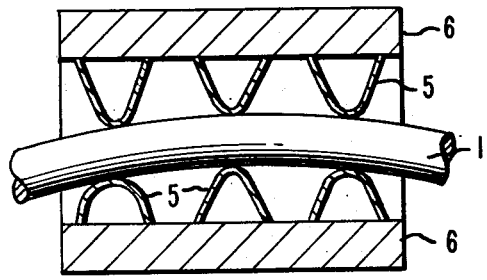

FIGS. 9a–9c shows a guide bearing made of spring wire.

Figure 10A:
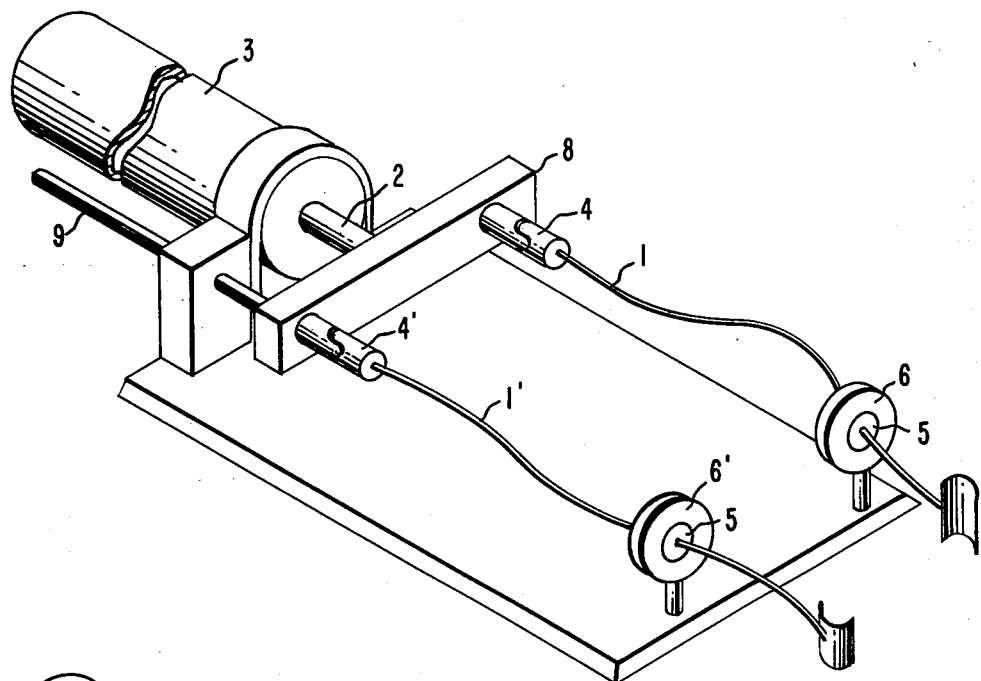
Figure 10B:
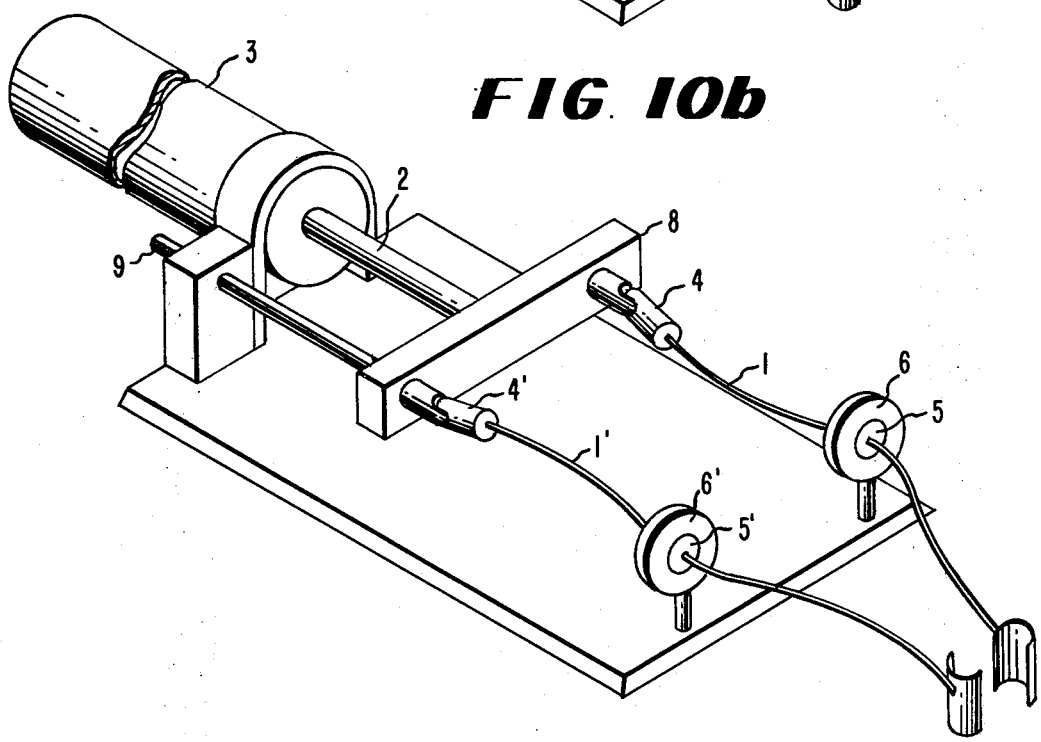

FIGS. 10a–10b shows a cam system in which two shaped rods are operated simultaneously in cooperation with each other.

DETAILED DESCRIPTION OF THE INVENTION

Figure 1:
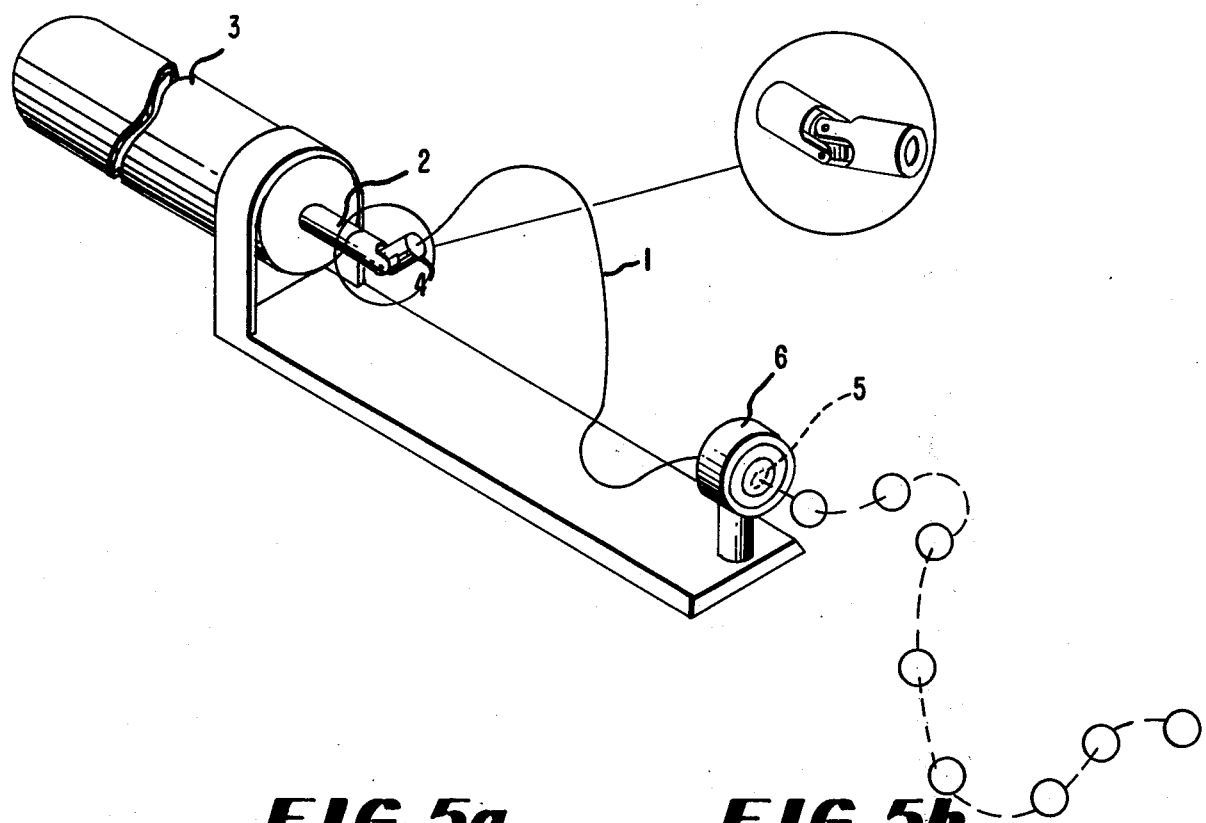
FIG. 1 shows an embodiment of the present invention, wherein a shaped rod constrained at one end is moved through an elastomeric guide.

A typical cam system of the present invention is shown in FIG. 1. In this embodiment, sliding, linear motion is imparted to one end of rod 1 by piston 2 travelling in pneumatic cylinder 3, the piston and the rod being connected through an ordinary universal joint 4. Piston 2 does not have any freedom to rotate. The shaped rod is held by guide bearing 5, itself lodged in holding member 6. The path of the end point of the rod is shown by broken line.

The universal joint 4 is shown in a larger scale drawing in a circle. To better show the construction details, the enlarged drawing shows the universal joint open at a slightly wider angle than in the main drawing of FIG. 1 and slightly twisted out of the plane shown in the main drawing.

While the apparatus illustrated in FIG. 1 uses a stationary guide bearing and a moving shaped rod, other alternatives are possible. Four such possible arrangements are schematically illustrated in the four drawings of FIG. 2: 2a, 2b, 2c and 2d. The first alternative, 2a, as in FIG. 1, has a stationary bearing-holding member 6 and a moving shaped rod 1. The rod 1 is connected to a source of simple input motion, not shown, through a connecting member 4. As the rod 1 moves through the bearing 5, its end W moves in a three-dimensional pattern and can be made to perform some useful work during its motion. In the schematic diagram 2b the shaped rod 1 is shown attached through a connecting member 4 to a stationary support. The guide bearing-holding member 6 is subjected to the input motion, as shown by arrows. The free end of the shaped rod 1 moves in a three-dimensional pattern. The arrangement 2c differs from the first two in that now the shaped rod 1 is firmly held at both ends. The guide bearing-holding member 6 is connected through a connecting member 4 to the source of input motion, while point W on the holding member 6 moves in a three-dimensional pattern and performs work during its travel. In the last embodiment, 2d, the guide bearing-holding member 6 is attached at one end through the connecting member 4 to a stationary support, while the point W makes a three-dimensional motion, as the shaped rod 1 moves through the guide bearing 5 in the direction shown by the arrows.

FIGS. 3a through 3d show schematically the movement sequence of shaped rod 1 to which is imparted a linear motion X. The rod moves through a stationary guide bearing as in FIGS. 1 and 2a. It can be seen that the free end point of the shaped rod follows a complex pattern.

Whereas a one-dimensional motion is a straight line, sliding motion, a two-dimensional motion can be any other planar motion; for example, circular, elliptical, triangular, rectangular, or irregular. The simplest two-dimensional motion is the circular motion.

FIGS. 4a through 4d schematically illustrate the movement sequence of shaped rod 1 to which is imparted at one end a circular motion. The free end point of the rod will follow a complex pattern.

The guide bearing which is one of the essential components of the instant combination must be capable of elastic deformation to allow a shaped, bent, or curved rod to move through it freely. This elastic deformability is achieved by constructing the guide bearing of an appropriate material, such as an elastomer or fabricated spring wire. Any elastomer which has sufficient mechanical strength, resistance, and resistance to lubricants can be used for this purpose, for example, various fluoroelastomers available commercially under such trade names as Viton ® and Fluorel ®; neoprene; hydrocarbon polymers such as, for example, ethylene/propylene copolymers and terpolymers and tetrapolymers with nonconjugated dienes; polyurethanes; sulfonated polyethylene; and silicone rubber. Guide bearings can be made of spring wire in any convenient manner, for example, as taught in U.S. Pat. No. 2,347,885 to Crickmer.

It is clear that relative movement of a shaped rod and a guide bearing one of them having only two degrees of freedom to rotate will force the guide bearing to change its orientation. It, therefore, is necessary to mount the guide bearing in a holding member which will allow the guide bearing to assume the required orientation. This result may be achieved in any convenient manner. Thus, for example, the holding member may itself be made of an elastomer or spring wire and may, in fact, be fabricated integrally with the guide bearing. Alternatively, the holding member may be made of a rigid material, for example, of metal such as steel of aluminum. In this case, the holding member usually will be mounted in a swivel or ball joint arrangement.

FIG. 5a shows a construction detail of an elastomeric guide bearing 5 held in a holding member 6 by means of ball joint 7. In FIG. 5b, it can be seen that the guide bearing is both deformed and reoriented by the movement through it of a curved rod 1.

An integrally fabricated elastomeric assembly of a guide-bearing and a bearing-holding member is shown in FIGS. 8a–8c. Bearing 5 is attached to the cylindrical member 7 by the struts 6. FIGS. 8a and 8c are sectional views, and FIG. 8b is an end view. The struts 6 and the cylindrical member 7 together form the bearing-holding member. It can be seen in FIG. 8c that both the guide bearing 5 and the struts 6 deform when the shaped rod 1 is inserted into the guide bearing.

In FIGS. 9a–9c is shown a guide bearing made of leaf springs. FIGS. 9a and 9c are sectional views and FIG. 9b is an end view. The bearing is constituted by the leaf springs 5 held in metal cylinder 6. FIG. 9c shows the deformation of the leaf springs 5, when the shaped rod 1 is inserted into the bearing.

FIGS. 10a–10b shows a pair of cam systems operated in cooperation with each other. Shaped rods 1 and 1' move through guide bearings 5 and 5' held by members 6 and 6'. The shaped rods are connected through universal joints 4 and 4' to bar 8, which is fixed to the end of piston 2 reciprocating in cylinder 3. Sliding rod 9 prevents rotation of the piston 2 and bar 8 assembly about its horizontal axis. FIGS. 10a and 10b illustrate two consecutive cam positions engaged in a cooperative movement.

Usually, either the shaped rod or the bearing-holding member will have one end constrained and one end free. The constrained end will be connected, through a connecting member to a drive mechanism providing the input motion. This may be, for example, a hydraulic or pneumatic cylinder, a gear system, a crank, or any similar device. The connecting member may be any type of universal joint, including those that operate in a nondirectional way, or a flexible coupling.

The role of the connecting member thus is to control the relative motion of the shaped rod and the elastomeric guide bearing. The connecting member is attached at one end to the shaped rod or the bearing-holding member and at the other end either to the source of input motion or to a fixed support. In either case, it allows the shaped rod or the bearing-holding member to assume proper orientation but prevents rotation. While a universal joint is a proper connecting member, a swivel joint is not.

Any device connected to any point on the moving member (shaped rod or bearing-holding member) can be made to perform some useful work, such as transporting an object from one position to another. For example, the free end of a moving shaped rod may hold a paint spray nozzle which is used to spray-paint a three-dimensional article.

The shaped rod itself should be substantially rigid, so that it will follow the imposed pattern of movement in a reproducible manner. However, if this reproducibility of movement can be achieved with a somewhat flexible shaped rod, strict rigidity is not required. The most common material from which the shaped rod is made is a metal, for example, iron, steel, copper, brass, bronze, nickel, and many others. Many synthetic plastic materials also are suitable. These include all those plastics, both thermosetting and thermoplastic materials, which can be readily shaped, are mechanically resistant to deformation and abrasion, and have a sufficiently high melting point not to be adversely affecting by friction during the operation of the instant cam system. Typical plastics include polystyrene, phenol-formaldehyde, and melamine-formaldehyde resins, nylons, polycarbonates, and polytetrafluoroethylene. A skilled engineer will be able to select proper materials for the construction of both the shaped rod and the guide bearing for any specific application. One will have to consider, for example, the speed of operation, length of travel, temperature along the bearing/rod contact surface, and type of input motion.

The shaped rod usually will be non-planar. Such a rod will be able to convert either a one-dimensional or a two-dimensional motion into a three-dimensional motion. If the shaped rod is planar, and the input motion is in a plane different from the plane of the shaped rod, the output motion will be three-dimensional. If the input motion is in the plane of the shaped rod, the output motion will be two-dimensional. It further will be readily realized that the cam system of the present invention is capable not only of converting a simple motion into a more complex motion but also of converting one two-dimensional motion into another two-dimensional motion or one three-dimensional motion into another three-dimensional motion.

The need for reducing friction between the guide bearing and the shaped rod is evident. One way to achieve this goal is by thorough lubrication of the contact area, either by an oil or by a lubricating grease. The lubricant may also be encapsulated in the guide bearing or shaped rod surface. One can also use a solid lubricant, such as, for example, graphite or powdered polytetrafluoroethylene. Another way to reduce friction is to choose bearing and rod materials having low friction coefficients, or to use low-friction coatings. Should the cam system of the present invention be used in a liquid environment, for example, underwater, the liquid itself may serve as the lubricant.

While only one possible design is illustrated in the drawings (FIG. 1), it is apparent that many equivalent designs are possible, all of them being contemplated by the present invention. Pairs or larger numbers of bearing-and-rod cam systems can be conveniently employed in operations requiring handling or manipulation of articles or materials in a repetitive manner. For example, a pair of cam systems operated by the same drive mechanism could be used to pick up a water container, carry it to its destination, and turn it to empty the water at the desired location. The wide variety of applications for which the cam system of the present invention is suitable includes, among others, the following:

Automatic devices for simple, repetitive operations without feedback (e.g., pick and place, spray paint, etc.). The motion is easily changed by replacing the control rod.

Automatic shovels — a device which digs, lifts, moves, and twists shovel.

Complex stitching — sew or tuft by a machine which uses one or many needles driven by control rods. Complex stitches are possible to form or join textile structures.

Artificial limb — a device which can execute a predetermined smooth (rather than robot-like) motion. For example, an artificial arm could be made which is actuated by the wearer by controlling the flow in a pressurized cylinder which moves a piston and drives the system.

Underwater device — a mechanical device in which the control rods reach into water or adverse environments. This type of device could utilize the sealing provided by the elastomeric guide bearing to transmit motion without leakage.

Paint spraying - the sprayer can be connected to the control rod and it can be programmed to move over a work piece (including the back side). Alternatively, the spray can simply be "aimed", but not translated by the system.

Rapid action mechanical programmer — a device in which control rods are formed and adjusted by hand (using heat and an appropriate plastic) and inserted into an elastomeric guide bearing cam system. This would enable an operator to rapidly program a complex, repetitive action.

Various types of drive mechanisms can be used with the cam system of the present invention. These include, for example, in addition to a pneumatic or hydraulic cylinder providing reciprocating motion, also a crank providing circular motion and a cam or linkage providing a complex motion. The shape of the rod, which is one of the elements of the cam system of the present invention, can be selected experimentally, for example, by performing manually the various steps of the desired movement and bending the rod to the extent required in each step to achieve the desired position in three-dimensional space. It also is possible to analyze mathematically a cam system of the present invention, that is, to predict the motion of a mechanical part (follower) from the cam shape. To synthesize a cam shape for generating a required motion, it would be necessary to solve the inverse problem by an iterative procedure. The following mathematical relationships are provided as illustrative. First, referring to FIGS. 6 and 7, each represents schematically a shaped rod of the present invention. In FIG. 6, it is shown in its base state, while in FIG. 7, it is shown during a work cycle, an elastomeric guide bearing being located at distance "s" from the origin. $Q_o$ in FIG. 6, is a point rigidly connected to the shaped rod whose motion will be followed. $Q_s$ in FIG. 7 is the same point in the new position in space.

The following are the basic variables:

s = coordinate along shaped rod giving the location of the elastomeric guide bearing (expressed as fraction of the total length).

x(s), y(s), z(s) = coordinates of point "s" of the control and its base state.

$\underline{Q}_o$ = vector from origin to point $Q_o$.
$\underline{Q}(s)$ = vector from origin to point $Q_s$.
$\underline{\underline{B}}(s)$ = matrix describing the motion of any point rigidly connected to the shaped rod. This depends on the rod shape and boundary conditions.

Auxiliary Variables $$r = \sqrt{x^2 + y^2 + z^2}$$

$$r_1 = \sqrt{y^2 + z^2}$$

$$u = x/r$$

$$v = y/r$$

$$w = z/r$$

$$m = 1 + w$$

$$n = r/r_1$$

The motion of point Q is described by the equation:

$$\underline{Q}(s) = \underline{\underline{B}}(s)\underline{Q}_o$$

It can be shown that the following matrix expressions are obtained for (A) a non-directional connecting member arrangement and (B) a standard (directional) universal joint arrangement:

$$\underset{\approx}{B} = \begin{pmatrix} w + mv^2 & -uvm & -u \\ -uvm & w + u^2m & -v \\ u & v & w \end{pmatrix} \quad (A)$$

and $$\underset{\approx}{B} = \begin{pmatrix} \frac{1}{n} & -uvn & -uwn \\ 0 & wn & -vn \\ u & v & w \end{pmatrix} \quad (B)$$

These equations can be solved, for example, by computer, using a simple program.

I claim:

1. A cam system capable of converting a simple motion into a more complex motion, said system comprising, in combination
   (a) a guide bearing capable of elastic deformation,
   (b) a bearing-holding member adapted to receive said bearing and capable of changing the orientation of said bearing,
   (c) a shaped, substantially rigid rod supportively held by said bearing, said rod and said bearing being capable of a relative motion with respect to each other, and at least one of said rod and said bearing-holding member (b) being linked with a source of the simple motion to be converted;
   one of said rod and said bearing-holding member being constrained so that it has only two degrees of freedom of rotational motion;
   the area of contact of said rod with said bearing either being lubricated or having a low relative friction coefficient.

2. A system of claim 1 wherein one of the shaped rod and the bearing-holding member is linked to the source of input motion through a connecting member selected from universal joints and flexible couplings.

3. A system of claim 2 wherein the bearing-holding member is stationary, and the shaped rod is connected to the source of input motion.

4. A system of claim 2 wherein the shaped rod is stationary, and the bearing-holding member is linked to the source of input motion.

5. A system of claim 1 wherein one of the shaped rod and the bearing-holding member is attached to a stationary support through a connecting member selected from universal joints and flexible couplings.

6. A system of claim 5 wherein the bearing-holding member is linked to a stationary support, and the shaped rod is connected to the source of input motion.

7. A system of claim 5 wherein the shaped rod is linked to a stationary support, and the bearing-holding member is connected to the source of input motion.

8. A system of claim 1 wherein the input motion is linear.

9. A system of claim 8 wherein the source of motion is a piston reciprocating in a cylinder, said piston having no freedom to rotate.

10. A system of claim 1 wherein the input motion is circular.

11. A system of claim 1 wherein the guide bearing is made of an elastomer.

12. A system of claim 1 wherein the guide bearing is made of spring wire.

13. A system of claim 1 wherein the bearing-holding member is fabricated integrally with the bearing.

14. A system of claim 1 wherein both the guide-bearing and the bearing-holding member are made of an elastomer.

15. A system of claim 1 wherein the shaped rod is made of metal.

16. A system of claim 1 wherein the shaped rod is made of a thermoplastic material.

17. A system of claim 1 wherein the shaped rod is made of a thermosetting material.

18. A system of claim 1 wherein the shaped rod is non-planar.

19. A system of claim 1 wherein the shaped rod is planar.

20. A system of claim 1 wherein the guide-bearing is held in the bearing-holding member by means of a ball joint.

21. A system of claim 1 wherein the boundary surface between the guide-bearing and the shaped rod is lubricated by means of a solid lubricant.

22. A system of claim 21 wherein the solid lubricant is graphite or polytetrafluoroethylene.

23. A system of claim 1 wherein a plurality of moving members can be operated simultaneously in cooperation with one another to perform a repetitive task.

* * * * *